United States Patent [19]
Aaron

[11] 3,832,953
[45] Sept. 3, 1974

[54] CONVEYOR FOR WHEELED VEHICLES

[75] Inventor: Albert Glenn Aaron, Chesterfield, Mo.

[73] Assignee: Passpoint Corporation, Maryland Heights, Mo.

[22] Filed: Aug. 30, 1972

[21] Appl. No.: 285,072

[52] U.S. Cl. .......... 104/162, 198/225, 214/16.1 DC
[51] Int. Cl. ............................................. B65g 25/10
[58] Field of Search ............ 104/162; 198/225, 221; 214/16.1 DC

[56] References Cited
UNITED STATES PATENTS
2,970,549  2/1961  Volk ........................... 214/16.1 DC
3,233,557  2/1966  Rickel ..................... 214/16.1 DC X FOREIGN PATENTS OR APPLICATIONS
829,323  3/1938  France ............................ 104/162
731,997  2/1943  Germany ......................... 104/162

Primary Examiner—Robert J. Spar
Assistant Examiner—George F. Abraham
Attorney, Agent, or Firm—Gravely, Lieder & Woodruff

[57] ABSTRACT

A conveyor for automatic car wash installations has a path along which the wheels of conveyed vehicles roll. A plurality of drive rollers move over the path and successively bear against the back sides of the vehicle tires so as to urge the vehicle forwardly along the path. The rollers are powered by fluid operated cylinders and during the return stroke of the reciprocal cylinder movement, the rollers move to a position along side the path so as not to interfere with the wheels on the path.

8 Claims, 6 Drawing Figures

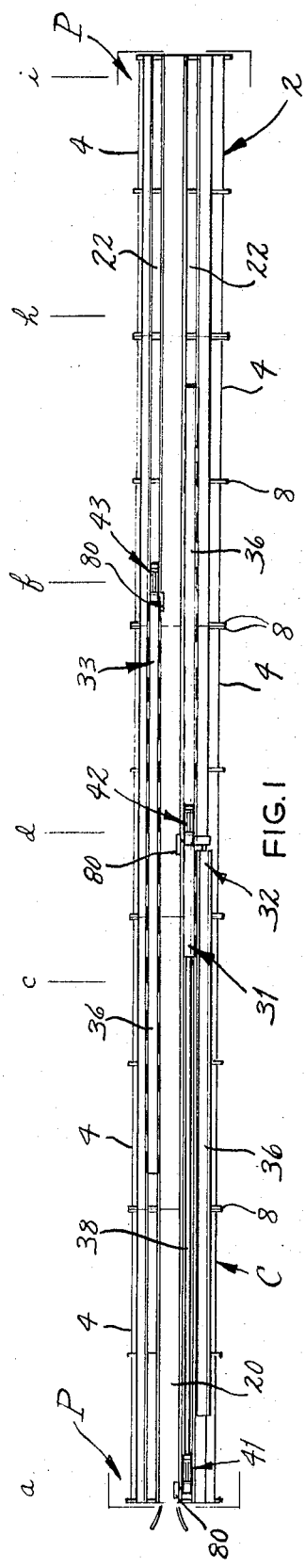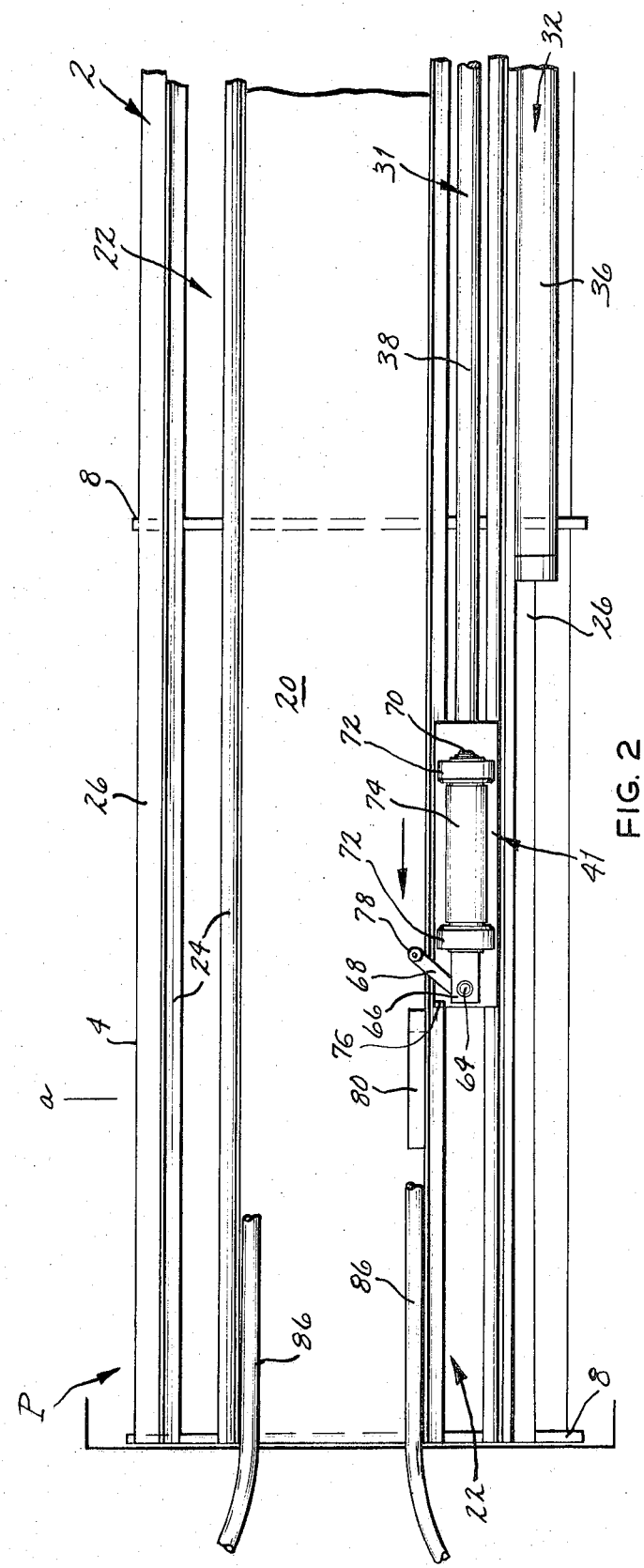

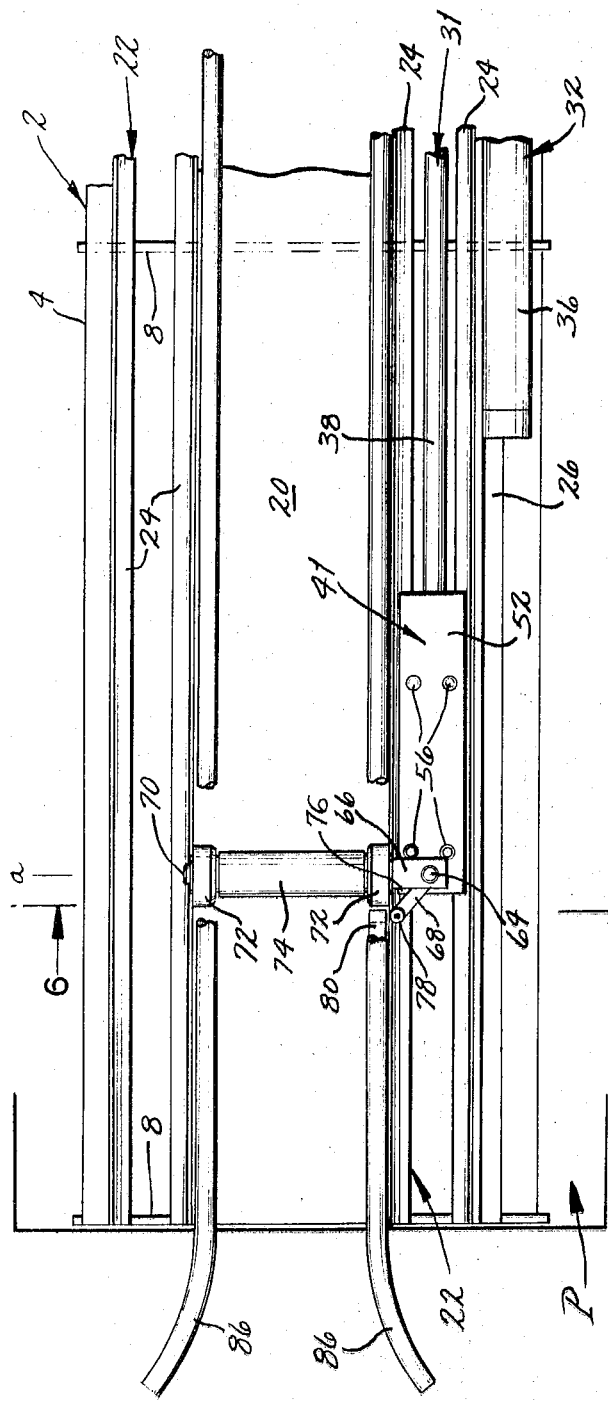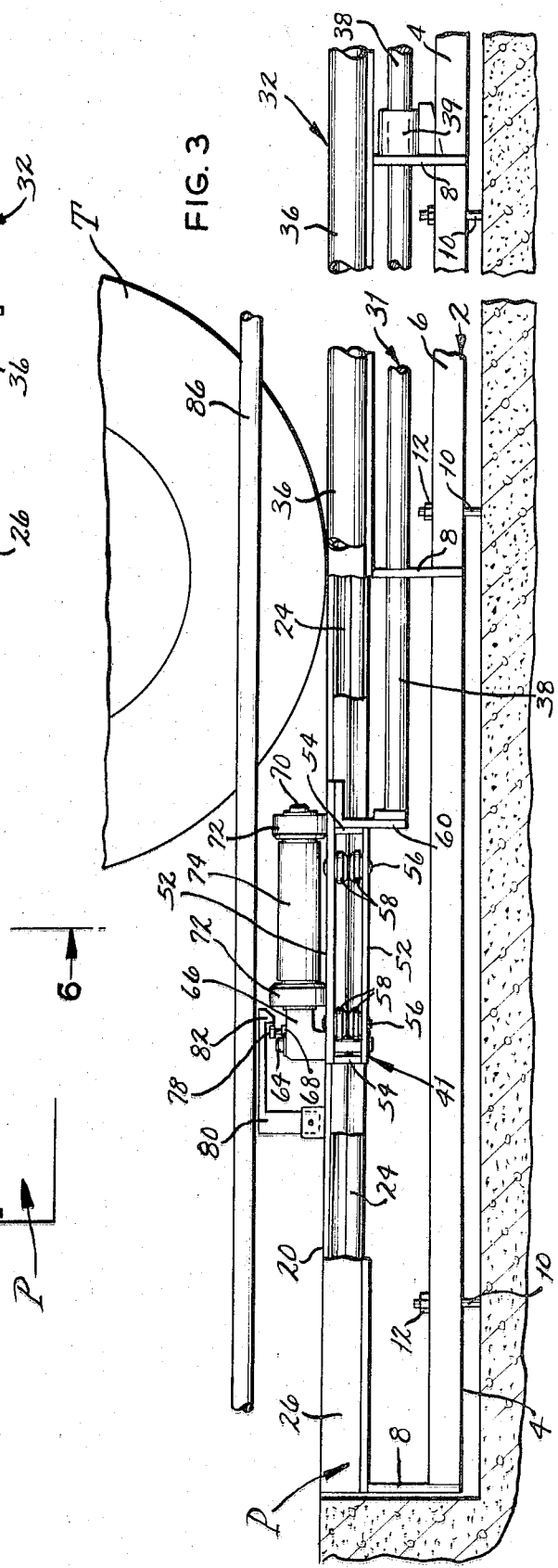

CONVEYOR FOR WHEELED VEHICLES

BACKGROUND OF THE INVENTION

This invention relates in general to conveyors, and more particularly to conveyors for moving wheeled vehicles.

The automatic car wash installations of current design utilize conveyors for moving automobiles past the water jets, brushes, and hot air nozzles which actually perform the washing and drying operations. The typical conveyor includes an endless chain which moves immediately below the path followed by the left or right wheels of the automobile being washed. This chain carries rollers which can be elevated to the path and positioned behind the left front wheel of an automobile at the beginning of the path. With continued movement of the chain the elevated roller engages the left front wheel and moves the entire vehicle through the car wash at a uniform velocity. Such a conveyor is disclosed in U.S. Pat. No. 3,554,132.

Conveyors of the foregoing construction are quite complex and have numerous moving parts. As a result they are expensive to manufacture and difficult to service. Moreover, they must be housed in a pit of substantial depth, and this further adds to the cost of the car wash installation.

SUMMARY OF THE INVENTION

One of the principal objects of the present invention is to provide a conveyor capable of moving wheeled vehicles, and particularly automobiles, through automatic car wash installations. Another object is to provide a conveyor of the type stated which has a minimum number of moving parts. A further object is to provide a conveyor of the type stated which is easy to manufacture and service. An additional object is to provide a conveyor of the type stated which is extremely reliable and durable. Still another object is to provide a conveyor of the type stated which utilizes fluid cylinders in lieu of endless chains for moving the automobiles. These and other objects and advantages will become apparent hereinafter.

The present invention is embodied in a conveyor for wheeled vehicles, which conveyor includes a path along which the vehicle wheels roll, a roller capable of being positioned over the path such that it will contact the wheel behind the road engaging surface of the wheel, and a fluid operated cylinder for urging the roller against the wheel so as to cause the wheel to roll along the path. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a plan view of a conveyor constructed in accordance with and embodying the present invention;

FIG. 2 is an enlarged plan view of the beginning end of the conveyor and showing rollers of the first carriage in their return position;

FIG. 3 is a side elevational view, partially broken away, and showing the rollers of the first carriage in their return position.

FIG. 4 is a plan view similar to FIG. 2, but showing the rollers of the first carriage in their drive position;

DETAILED DESCRIPTION

Figure 5:
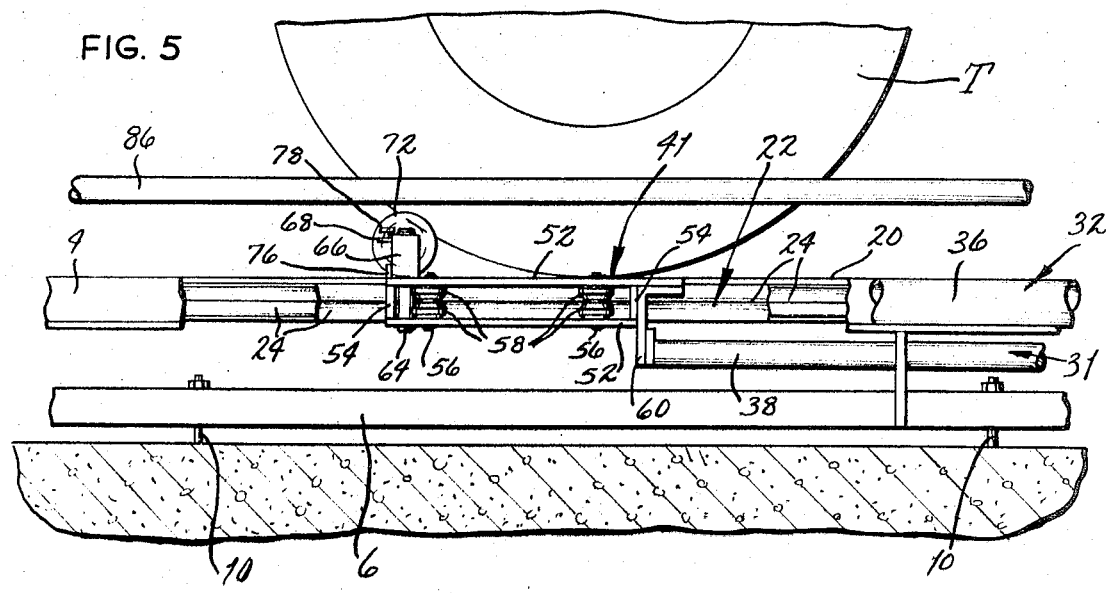
FIG. 5 is a side elevational view partially broken away and showing rollers of the first carriage in their drive position.

Referring now to the drawings (FIG. 1), C represents a conveyor which is disposed within a shallow pit P in the floor of a car wash installation. The conveyor C extends substantially the entire length of the car wash installation and moves automobiles which are driven onto it past water jets, brushes, hot air nozzles and the like, forming part of the car wash equipment.

The conveyor C includes (FIG. 1) a track assembly 2 which is composed of a plurality of aligned track sections 4 set end-to-end and bolted together. The individual track sections 4 are fabricated at a remote location and are thereafter transported to the car wash installation where they are assembled into the track assembly 2.

Each track section 4 is preferably about 10 feet long and includes a pair of longitudinally extending base members 6 (FIG. 3) and bulk heads 8 welded to the base members to form a rigid framework. The bulk heads 8 at the ends of adjacent track sections 4 are bolted together, whereas the base members 6 fit over threaded studs 10 which are set into and project upwardly from the floor of the pit P. The base members 6 actually rest on jam nut 12 (FIG. 6) which are threaded over the studs 10 so that the height of the track sections 4 can be adjusted by turning the nuts 12. The track sections 4 are secured firmly in place by nuts 14 which also thread over the studs 10 and are tightened down against the top surfaces of the base members 6. To provide additional subjacent support for the track sections 4, shims may be fitted between the base members 6 and the floor of the pit P.

Extended over and welded to the bulk heads 8 of each track section 4 is a top plate 20 (FIG. 6) which is somewhat wider than an automobile tire T and forms a path capable of supporting the wheels at one side of an automobile as the automobile is advanced through the car wash installation. On both sides of the top plate 20, the track section 4 is provided with carriage tracks 22 (FIGS. 2 and 6) and each carriage track 22 is formed by a pair of longitudinally extending angle members 24 which are positioned such that the vertices thereof are directed toward each other. The angle members 24 are welded to and supported by suitable supporting members which bridge the bulk heads 8. The supporting members 26 to which the innermost angle members 24 are welded merge into the top plate 20.

As previously mentioned the individual track sections 4 are shipped to the car wash installation individually, and the track assembly 2 is assembled therefrom within the pit P. In the assembly operation the height of each individual track section 4 is adjusted such that the top plates 20 and the two carriage tracks 22 of adjacent track sections 4 align. Once the adjacent sections 4 are aligned the bulk heads 8 at the opposed ends thereof are bolted securely together. The height of the track assembly 2 should be adjusted so that its top plate 2 is approximately at the level of the floor in which the pit P is located.

The track assembly 2 carries three fluid cylinders 31, 32 and 33 (FIG. 1) which may be hydraulic or air operated cylinders and which operate sequentially to propel an automobile along the path formed by the top plate 20. Each cylinder 31, 32 and 33 is of the double acting variety and includes a barrel 36, which is fastened firmly to bulk heads 8 of the track assembly 2, and a piston rod 38 which telescopes into the barrel 36 and extends and retracts therefrom. The barrel 36 of the first cylinder is mounted directly below the right carriage track 22 and generally midway between the two ends of the track assembly 2 with its piston rod 38 projecting toward the beginning of the track assembly 2. The positioning is such that its piston rod 38 will reach almost to the beginning of the track assembly 2 when completely extended. The second cylinder 32 is positioned to the outside of the right carriage track 22 with its barrel 36 closer to the beginning of the track assembly 2 than to the terminal end of the track assembly 2. Its piston rod 38 projects toward the terminal end of the track assembly, but will not reach the terminal end when fully extended. The third cylinder 33 is positioned below left carriage track 22 with its barrel 36 being generally midway between the ends of the track assembly 2. Its piston rod 38 projects toward the terminal end of the track assembly 2 and reaches substantially to that terminal end when fully extended.

The bulk heads 8 are cut away directly beneath the two carriage tracks 22 (FIG. 6) to provide adequate clearance for the piston rods 38 of the first and third cylinders 31 and 33 when those piston rods are extended. This prevents the piston rods 38 from being scored on the bulk heads 8 as they extend. Moreover, each piston rod 38 is fitted with a support sleeve 39 (FIG. 3) which extends with that rod until the rod reaches about the midpoint of its stroke. At that point the support sleeve engages a supporting device and provides subjacent support for the rod as it moves still further. In the case of the first and third cylinders 31 and 33 the support sleeves 39 thereof engage a bulk head 8, whereas in the case of the second cylinder 32 the support sleeve 39 thereof engages a bracket carried by the support member 26 to which the barrel 36 of that cylinder is attached. Thus, the support sleeves 39 are preferably formed from a low friction material such as Teflon and prevent the long piston rods 38 from bowing downwardly when they are fully extended and perhaps becoming scored on underlying structures.

The remote end of the piston rod 38 for the first cylinder 31 is connected with (FIG. 1) a first carriage 41 which rides on the right carriage track 22. Likewise, the remote end of the piston rod 38 for the second cylinder 32 is connected to a second carriage 42 which also rides on the right carriage track 22, but is located further along that track, that is it is located closer to the terminal end of the track assembly 2, than the first carriage 41. The third cylinder 33, on the other hand, has the free end of its piston rod 38 connected to a third carriage 43 which rides on the left carriage track 22. The carriages 41, 42 and 43 are identical in construction, and therefore only the carriage 41 will be described in detail.

Figure 6:
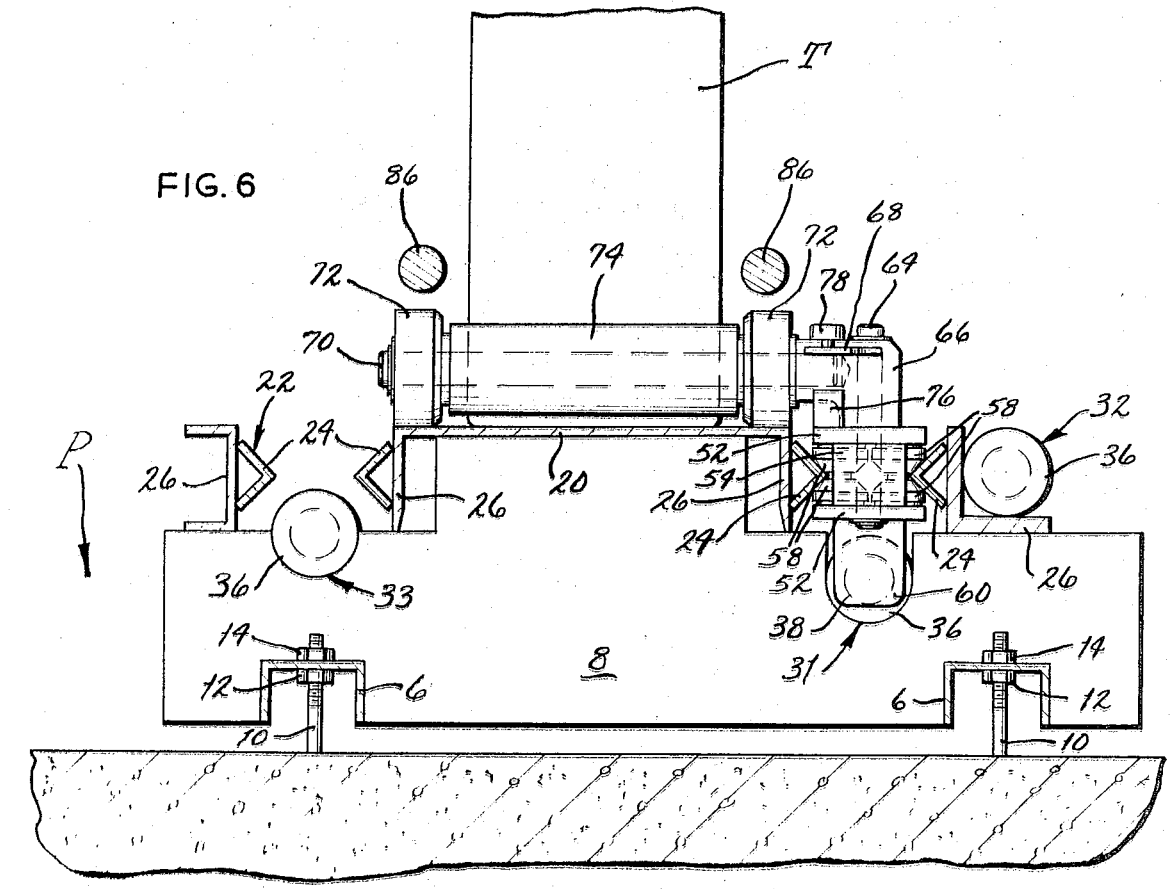
FIG. 6 is a sectional view taken along lines 6—6 of FIG 4.

The first carriage 41 includes (FIGS. 5 and 6) upper and lower plates 52 interconnected by end walls 54. The upper plate 62 is somewhat longer than the lower plate 52 at one end of the carriage 41. Fastened to the plates 52 and extending through the space between them are spindles 56 which are arranged in pairs with one pair being close to one end wall 54 and the other pair being close to the other end wall 54. Each spindle 56 serves as a journal for a pair of frusto-conical rollers 58 which are mounted with their beveled side faces canted in opposite directions and facing each other. Moreover, the bevels of those side faces are such that they correspond to the inclination of the flanges on the angle members 24. The spindles 54 of each pair are spaced apart such that the carriage 41 will fit between the angle members 24 of the right carriage track 22 with the beveled side faces of the rollers 58 engaged with the flanges of the angle members 24 (FIG. 6). When so positioned, the first carriage 41 is free to move longitudinally along the right track 22, but cannot be withdrawn laterally or vertically therefrom.

Welded to the longitudinally projecting portion of the upper plate 52 for the first carriage 41 is connecting bracket 60 (FIG. 5) which is connected to the exposed end of the piston rod 38 for the first cylinder 31. The connection is such that a limited amount of free motion in the direction transverse to the direction of movement is afforded to compensate for any misalignment of the carriage 41 with respect to the cylinder 31. At its opposite end, the carriage 41 is provided with a pintle 64 (FIGS. 2, 3, and 6) which is secured in the upper and lower plates 52 and projects above the upper plate 52. The upwardly projecting portion of the pintle 64 serves as a journal for a roller block 66 having an actuating arm 68 and an axle 70 extended therefrom. The axle 70 forms a journal for a pair of supporting rollers 72 and for a tire driving roller 74, the latter being interposed between the former. The length of the tire driving roller 74 is greater than the width of an automobile tire T, but is still less than the width of the top plate 20 on the track assembly 2, so that the spacing between the supporting rollers 72 does not exceed the width of the top plate 20 (FIG. 6).

The pintle 64 enables the roller block 66 to swing between a drive position and a return position. When in the drive position (FIGS. 4, 5 and 6), the block 66 abuts against a stop block 76 (FIGS. 4 and 6) on the upper plate 52 of the carriage 41 and the axle 70 projects laterally over the top plate 20 of the track assembly 2. When so positioned the supporting rollers 72 rest on the top plate 20, while the tire driving roller 74 disposed between them is positioned slightly above the top plate 20 and is centered with respect thereto. When the roller block 76 is in its return position (FIGS. 2 and 3), the axle 70 is disposed over the carriage 41 with the supporting rollers 72 resting on the upper plate 52. Moreover, the actuating arm 68 projects laterally beyond the side of the carriage 41. The actuating arm 68 carries a roller 78 which rotates about a vertical axis. Thus, when the roller block 66 is in its drive position, the axle 70 and driving roller 74 thereon may be said to be in their operative positions. On the other hand, when the roller block 66 is in its return position, the axle 70 and driving roller 74 may be said to be in their inoperative positions.

The piston rods 38 of the remaining cylinders 32 and 33 are connected to the carriages 42 and 43, respectively, in a like manner. In this regard, it should be noted that the connecting bracket 60 for the third carriage 43 is substantially the same as the connecting bracket 60 for the first carriage 41. The connecting bracket 60 for the second carriage 42, however, possesses a somewhat different configuration, inasmuch as the second cylinder 32 is disposed to the side of the right carriage track 22 instead of beneath it as is the first cylinder 31. Indeed, the bracket 60 for the second carriage 42 is elongated to enable it to pass over the outermost angle member 24 of the right track 22 (FIG. 1).

Mounted on the track assembly 2 at the beginning or rearmost positions for the carriages 41, 42 and 43, that is at points a, d, and f, are tripping devices 80 (FIGS. 1–3), each of which pivots about a horizontal axis and has a pawl 82 at its forwardly presented end. The pawls 82 have inclined faces located in the paths of the rollers 78 on the actuating arms 68 for the carraiges 41, 42 and 43. Thus, as the first carriage 41, while moving toward the beginning of the track assembly 2, approaches its tripping device 80 with its roller block 66 in the return position (FIG. 2), the roller 78 on the actuating arm 68 will engage the inclined forward face of the pawl 82 and cam the entire tripping device 80 upwardly. Once the roller 78 clears the pawl 82, the tripping device 80 will drop downwardly again and the pawl 82 will be disposed directly ahead of the roller 78. Now when the cylinder 31 is energized in the opposite direction the roller 78 on the actuating arm 68 is restrained by the pawl 82 on the tripping device 80. This causes the roller arm 78 to pivot or rotate about the pintle 64. Indeed, the roller block 66 will swing from its return position wherein the axle 70 is disposed over the carriage 41 to its drive position (FIG. 4) wherein the block 66 abuts the stop block 76 and the axle 70 is disposed over the top plate 20 along which the automobile tires T roll. The same occurs when the other carriages 42 and 43 approach their rearmost or beginning positions and are moved away therefrom.

When the first carriage 41 is in its beginning position $a$ (FIG 1), the rollers 72 and 74 thereof will at the entrance to the track assembly 2. When the first carriage 41 is in its terminal or end position $c$ and the second carriage 42 is in its beginning position $d$, the longitudinal spacing between the sets of rollers 72 and 74 of the two carriages 41 and 42 will be less than the wheel base of an automobile. When the second carriage 42 is in its end position $h$ and the third carriage 43 is in its beginning position $f$, the rollers 72 and 74 of the second carriage 42 will be ahead of the rollers 72 and 74 of the third carriage 43 and the spacing between the two sets of rollers 72 and 74 will be less than the wheel base of an automobile. Finally, when the third carriage 43 is in its end position, the rollers 72 and 74 thereof will be near the terminal end of the track assembly 2.

The tracks 22 and carriages 41, 42 and 43 which run on them are concealed by cover plates (not shown) which are fastened to the track sections 4. The cover plates 84 in turn carry guide rails 86 which extend along the side edges of the top plate 20 upwardly therefrom and keep the wheels of automobiles on the top plate 20.

OPERATION

At the outset of operation, the roller blocks 66 of the three carriages 41, 42 and 43 are positioned in their return positions, in which case the axles 70 projecting therefrom extend longitudinally of the carriage tracks 22 and the supporting rollers 72 rest on the carriages 41, 42 and 43 themselves. In other words, the rollers 72 and 74 do not obstruct the tire path along the top plates 20 of the track assembly 2. Moreover, the first carriage 41 is located at its beginning position $a$ (FIGS. 1 and 2) where the roller 78 on its actuating arm 68 is engaged with the first tripping device 80, in which case the piston rod 38 of the first cylinder 31 will be fully extended. The second carriage 42 is located at its beginning position $d$ (FIG. 1) where its roller 78 is engaged with the second tripping device 80, in which case the piston rod 38 of the second cylinder 32 will be fully retracted. The third carriage 43 is in its beginning position $f$ (FIG. 1) where it engages the third tripping device 80, in which case the piston rod 38 of the cylinder 33 for that carriage will be fully retracted.

To advance an automobile along the conveyor C, the automobile must be first driven onto the track assembly 2 until its left rear wheel is slightly ahead of the beginning position $a$ for the first carriage 41 (FIG. 3). More specifically, the left tires of the automobile are aligned with the top plate 20 of the track assembly 2 and then the automobile is driven forwardly so that its left front wheel passes between the guide rails 86 and onto the top plate 20 of the track assembly 2. The left rear wheel of course will follow and when it is positioned slightly ahead of the beginning position $a$ for the first carriage 41, the vehicle transmission is placed in neutral and the brakes are released.

Once the automobile is so positioned, the first cylinder 31 is energized such that its piston rod 38 retracts and hence moves forwardly. The first carriage 40 moves forwardly also, but the roller 78 on the laterally projecting actuating arm 68 remains engaged with the pawl 82 on the first tripping device 80. Therefore, during the initial increment of carriage movement, the roller block 66 pivots or rotates on the first carriage 41 and moves to its drive position (FIG. 4), in which case the axle 70 thereof will be positioned over and the supporting rollers 72 will rest on the top plate 20 of the track assembly 2. Moreover, the tire driving roller 74 will be located behind the left rear tire T of the automobile. Continued movement of the first carriage 31 brings the tire driving roller 74 against the rearwardly presented face of the tread on the left rear tire T (FIG. 5). Upon engaging that tire the driving roller 74 propels the entire car forwardly. The supporting rollers 72 ride on the top plate 20 and support the tire driving roller 74 above that plate. As the first carriage 41 advances, the supporting rollers 72 revolve in the direction of wheel rotation, while the tire driving roller 74 revolves in the opposite direction. The guide rails 86 keep the left tires T of the automobile on the top plate 20 of the track assembly 2.

When the first carriage 41 approaches its terminal position $c$, its speed is reduced by restricting the flow of fluid to the first cylinder 31, and furthermore the second cylinder 32 is energized to extend its piston rod 38 and advance the second carriage 42. As the second carriage 42 moves forwardly its actuating arm 68 is restrained by the second tripping device 80, so as to position the supporting rollers 72 and drive roller 74 for that carriage over the top plate 20 of the track assembly 2. When the rollers 72 and 74 are so positioned, they will be disposed to the rear of the left front tire. Continued movement of the piston rod 38 for the second cylinder 32 advances the tire driving roller 74 of the second carriage 42 against the back side of the left front tire, so that the automobile continues to advance along the conveyor C.

While the carriage 42 connected to the second cylinder 32 is advancing the automobile, the first cylinder 31 is energized in the opposite direction to move that first carriage 41 back to its beginning position a. As the first carriage 40 commences its rearward or return movement, the supporting rollers 72 more or less slide across the top plate 20 and cause the roller block 66 to swing back to its return position, wherein the rollers 72 and 74 are located over the first carriage 41 and do not obstruct the top plate 20. A spring may be employed to assist returning the rollers 72 and 74 to their return position. If during the return movement another automobile is driven onto the conveyor C, the rollers 72 and 71 will pass to the sides of the wheels of the second automobile. The cycle is repeated for the second automobile while the preceding automobile is still on the conveyor C.

Returning now to the second carriage 42, as it approaches its end position h the flow of fluid into the second cylinder 32 is reduced to decrease the speed of its piston rod 38 and the carriage 42 connected thereto. At about the same time, the third cylinder 33 is energized, causing its piston rod 38 to extend. The third carriage 43 of course advances, while the roller 78 on its actuating arm 68 initially remains engaged with the third tripping device 80 so that during the initial increment of movement the roller block 66 on the carriage 43 swings from its return position to its drive position. When the roller block 66 of the third carriage 43 is in its drive position, the rollers 72 and 74 carried thereby will be disposed behind the left rear tire. Continued movement of the third carriage 43 drives the tire driving roller 74 thereof against the back side of the left rear tire T so that the advancement of the automobile is continued along the conveyor C.

Once the third cylinder 33 assumes the propelling function, the second cylinder 32 returns the second carriage 42 to its beginning position d, and at the outset of the return movement the roller block 66 on that carriage 42 swings from its drive position to its return position wherein the rollers 72 and 74 will not obstruct the top plate 20 of the track assembly 2. If the next autmoible has been advanced to the position where the second carriage 42 can propel it, the second cylinder 32 will move the carriage 42 through its initial position d, without having the rollers 72 and 74 thereof interfere with the tires T. The cycle for the second cylinder 32 may be repeated at this time to advance the next automobile.

Returning now to the third carriage 43, the cylinder 33 connected thereto moves that carriage to its terminal position i where the automobile leaves the track assembly 2. The third cylinder 33 then retracts its piston rod 38 43 return the third carriage 43 to its initial position f and as the carriage 44 returns the rollers 72 and 74 thereof move to the return position, in which case they are positioned over the carriage 42 and do not obstruct the top plate 20. Should the following automobile be positioned with its rear wheel ahead of the beginning position f for the third carriage 44, the third carriage 44 will repeat the foregoing cycle and pick up the following automobile.

From the foregoing operation it is apparent that three automobiles can be advanced along the conveyor C at once.

The fluid circuitry for the conveyor C may include manually actuated valves for operating the three cylinders 31, 32 and 33. However, it is desirable to have the valves operate automatically. It is also desirable to couple those valves with sensing devices (not shown) which ascertain the location of an automobile along the track assembly 2 and permit the conveyor C to automatically correlate the movement of the carriages 41, 42 and 43 with the automobiles. For example, the sensing devices will cause a carriage to pass through its initial position without interruption if another automobile is positioned ahead of the starting position for the carriage. They also serve as a safety device for preventing a succeeding car from ramming a preceding car if a drive roller 74 passes under the tire it is driving.

While the conveyor C described herein has three cylinders and carriages, more or less than three cylinders and carriages may be used, depending on the length of the conveyor. Also, the carriage tracks 22 need only extend the distance actually travelled by the carriage or carriages they support, and therefore, in the case of the three cylinder conveyor C described herein, the left track 22 may be eliminated for approximately the first half of the track assembly 2. Furthermore, the conveyor C may be utilized such that it operates against the right tires instead of the left tires as heretofore described.

This invention is intended to cover all changes and modifications of the example of the invention herein chosen for purposes of the disclosure which do not constitute departures from the spirit and scope of the invention.

What is claimed is:

1. A conveyor for moving wheeled vehicles, said conveyor comprising: a path along which the wheel of a vehicle rolls; a carriage track positioned alongside the path; a carriage on and movable along the track; a roller block mounted on the carriage for rotational movement about an upright axis between a drive position and a return position, the roller block having a laterally projecting actuating arm; an axle projecting horizontally from the roller block; a roller positioned on the axle for rotation about it, the roller being disposed over the path for engaging the peripheral surface of a wheel thereon when the carriage moves with the roller block in its drive position, the roller being positioned such that it will not obstruct the path and will pass by the wheel when the carriage moves with roller block in its return position; a tripping device having a pawl located adjacent to the carriage track and in alignment with the actuating arm when the roller block is in the return position so that the arm engages the pawl as the carriage moves toward it, whereby movement of the carriage away from the tripping device will cause the roller block to pivot about its upright axis and swing the roller from its return position to its drive position; and a fluid operated cylinder connected with the carriage for moving the roller against the peripheral surface of a wheel on the path so that the wheel and vehicle are advanced along the path.

2. A conveyor for moving wheeled vehicles, said conveyor comprising: a path along which wheels of the vehicle roll; a track on each side of the path; a carriage on each track; a fluid operated cylinder connected with each carriage for moving the carriages along their respective tracks, one of the fluid operated cylinders being positioned to advance the carriage connected thereto when it retracts and another of the fluid operated cylinders being positioned to advance the carriage connected thereto when it extends; a roller mount carried by each carriage and shiftable thereon between drive and return positions; and drive rollers on the roller mounts and being shiftable with the roller mounts between the drive and return positions, each drive roller being positioned over the path with its axis generally transverse thereto when in its drive position so that it will move against the peripheral surface of a vehicle wheel and advance the wheel along the path when its carriage moves in the direction of advance along the conveyor, each roller being positioned to the side of the path when in its return position so as to pass by a wheel on the path as its carriage moves in the opposite direction.

3. A conveyor for moving wheeled vehicles, said conveyor comprising: a path along which the wheel of a vehicle rolls in a direction of advance; a track located adjacent to the path and extending in the same direction as the path; a carriage on the track; a fluid operated cylinder connected to the carriage for moving the carriage back and forth along the track in the direction of advance and in the opposite direction; an axle mounted on the carriage and movable relative to the carriage between operative and inoperative positions in response to operation of said cylinder to move said carriage respectively in the direction of advance and in the opposite direction; at least one support roller on the axle for rolling along a surface fixed in position with respect to the path when the axle is in its operative position and for supporting the axle in an elevated position above the path; a drive roller supported on the axle above the path and being rotatable independently of the support roller, the drive roller when the axle is in its operative position being positioned to align with and to contact the peripheral surface of a vehicle wheel on the path as the cylinder moves the carriage in the direction of advance and toward the wheel, whereby the vehicle is moved, the drive roller when the axle is in its inoperative position being positioned such that it does not obstruct the path, whereby the vehicle wheel can pass by it; and means for causing the force delivered by the cylinder during operation thereof which moves said carriage in the direction of advance to move the axle from its inoperative to its operative position near the location where the carriage commences to move in the direction of advance so that the drive roller will contact the peripheral surface of the vehicle wheel when the carriage moves in the direction of advance.

4. A conveyor according to claim 3 wherein the roller and fluid operated cylinder are one of a plurality of rollers and fluid operated cylinders; and wherein the cylinders move the rollers connected thereto such that the rollers successively engage the wheels of the vehicle and propel the vehicle along the path.

5. A conveyor according to claim 3 and further characterized by a roller block which is mounted on the carriage for rotational movement about an upright axis; and wherein the axle projects generally horizontally from the roller block.

6. A conveyor for moving wheeled vehicles, said conveyor comprising: a path along which the wheel of a vehicle rolls, the path having a beginning end and a discharge end; track means adjacent to the path; at least two carriages on the track means; drive rollers mounted on the carriages and rotatable relative thereto and to the path, each drive roller being shiftable on its carriage between an operative position, wherein it is disposed over the path and extended transversely thereof for contacting the peripheral surface of the vehicle wheel, and an inoperative position, wherein it does not obstruct the path so a vehicle wheel can roll past it; and a different fluid operated cylinder connected with each carriage for propelling the carriages along the track means, one of the fluid operated cylinders being mounted such that it advances its carriage toward the discharge end of the path as it retracts, another of the fluid operated cylinders being mounted such that it advances its carriage toward the discharge end as it extends.

7. A conveyor according to claim 6 wherein the track means comprises two separate tracks with one being on one side of the path and the other being on the other side of the path; and wherein the carriage propelled by said one cylinder is on the one track and the carriage propelled by said another cylinder is on the other track.

8. A conveyor according to claim 6 wherein rollers are advanced toward the discharge end of the path over generally different and successive portions of the track.

* * * * *